United States Patent
Reinhardt et al.

(10) Patent No.: US 7,337,395 B2
(45) Date of Patent: Feb. 26, 2008

(54) SYSTEM AND METHOD FOR HIERARCHICAL DATA DOCUMENT MODIFICATION

(75) Inventors: Tilo Reinhardt, Walldorf (DE); Stefan J. Moeller, Laudenbach (DE)

(73) Assignee: Sap AG, Walldorf (DE)

( * ) Notice: Subject to any disclaimer, the term of this patent is extended or adjusted under 35 U.S.C. 154(b) by 605 days.

(21) Appl. No.: 10/789,721

(22) Filed: Feb. 27, 2004

(65) Prior Publication Data

US 2005/0193009 A1 Sep. 1, 2005

(51) Int. Cl.
*G06F 15/00* (2006.01)

(52) U.S. Cl. .............. 715/523; 715/503; 715/514; 707/104.1

(58) Field of Classification Search ............. 715/503, 715/514, 523; 707/104.1
See application file for complete search history.

(56) References Cited

U.S. PATENT DOCUMENTS 7,003,722 B2 * 2/2006 Rothchiller et al. ........ 715/513
7,017,112 B2 * 3/2006 Collie et al. ................ 715/513

OTHER PUBLICATIONS

Young, Michael J., "Microsoft Office System Inside Out: 2003 Edition", Sep. 10, 2003, Microsoft Press, 2003 Edition, pp. 1-15.*
Korpela, Jukka, "Tab Separated Values (TSV): a format for tabular data exchange", Oct. 20, 2001, pp. 1-6, <http://web.archive.org/web/20011020072430/http://www.cs.tut.fi/~jkorpela/TSV.html>.*

* cited by examiner

*Primary Examiner*—Stephen Hong
*Assistant Examiner*—David Faber
(74) *Attorney, Agent, or Firm*—Kenyon & Kenyon LLP (57) ABSTRACT

A system and method for data element extraction from hierarchically structured documents. According to one embodiment, a generator extracts a plurality of data elements from a stored hierarchical data file that is in a first format, in accordance with a data set that is unique to the particular hierarchical data file, and arranges the plurality of data elements in a second format so that the arrangement provides the plurality of data elements with a document context, and so that the data elements can be further arranged in a third format without using the data set.

4 Claims, 5 Drawing Sheets

FIG. 1

| Category 200 | Category 210 | Item Number 220 | Metadata Category 230 | Upload 240 | Metadata Entry 250 | | Metadata Entry 255 | |
|---|---|---|---|---|---|---|---|---|
| Header | Basic Data | | | | Technical name | HEADER-DOCUMENT_TYPE | HEADER-PROCESS_TYPE | |
| Header | Basic Data | | | | Description | Document type | Process type | |
| Header | Basic Data | | | | Modifiability | | | |
| Item | Basic Data | | | | Technical name | ITEM-ITM_RELEASED | ITEM_ADD-ITM_RELEASED_TXT | |
| Item | Basic Data | | | | Description | Status (ID) | Status (Text) | |
| Item | Basic Data | | | | Modifiability | X | | |
| | | | | | | | | |
| Header | Partner | | | | | Vendor | | |
| Header | Partner | | | | | Calloff Purchasing Organisation | | |
| Header | Partner | | | | | Employee responsible | | |
| Header | Partner | | | | | Location | | |
| Header | Longtext | | | | | Internal Note | | |
| Header | Longtext | | | | | Vendor Text | | |
| Item | Conditions | 1 | | | | Discount (relative, dependend on location) | | |
| Item | Dyn. Attributes | 1 | | | | aktiv | | |
| Item | Basic Data | 2 | | | | Goods recipient | | |
| Item | Partner | 2 | | | | Internal Note | | |
| Item | Longtext | 2 | | | | Price | | |
| Item | Conditions | 2 | | | | | | |
| Item | Dyn. Attributes | 2 | | | | | | |
| Item | Basic Data | Hardware/PC/1 | | | | aktiv | | |
| Item | Partner | 3 | | | | Goods recipient | | |
| Item | Partner | 3 | | | | Goods recipient | | |
| Item | Partner | 3 | | | | Location | | |

Metadata Section 260 spans the Metadata Category/Upload/Metadata Entry columns.
Core-Data Section 270 spans the rightmost data columns.

SYSTEM AND METHOD FOR HIERARCHICAL DATA DOCUMENT MODIFICATION

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

Users may work with files, e.g. documents, in a computer environment. Often, users not only view documents, but also modify them. Documents may be provided for a user to view in one mode and to modify in another mode. In some environments, during a file download, the computer environment extracts the document's data elements to allow the user to modify the document. Subsequent to the modification, during a file upload, the computer environment itself arranges the data elements of the file in the output document. This configuration is particularly useful in environments that provide shared documents of generic form for transactions between multiple users.

The data elements are provided to the user for modification in data element format, rather than in a document format, and are therefore provided without a document context. The document context of data elements of hierarchically structured documents, where the documents include many sections that relate to each other, e.g. documents that have a first page with tabs to display further contents that relate to the first page, is especially complex. Consequently, especially with respect to hierarchically structured documents, users can modify document data elements extracted from their document's context only with great difficulty. Users may not be able to determine which data elements to modify and therefore refrain from modifying the document data. Additionally, users may modify the wrong document data. Similarly, the computer environment can arrange the modified data elements in a document only with great difficulty. Therefore, there is a need in the art for a system and/or method of data element extraction and arrangement that provide the user and the computer environment with document context for the data elements.

DETAILED DESCRIPTION OF EXAMPLE EMBODIMENTS

Embodiments of the present invention generally relate to modification of a document's data elements. More particularly, embodiments relate to the arrangement of data elements and metadata elements to aid users in the modification of hierarchically structured documents' data elements, and to aid a computer environment in the arrangement of the data elements within usable documents.

Figure 1:
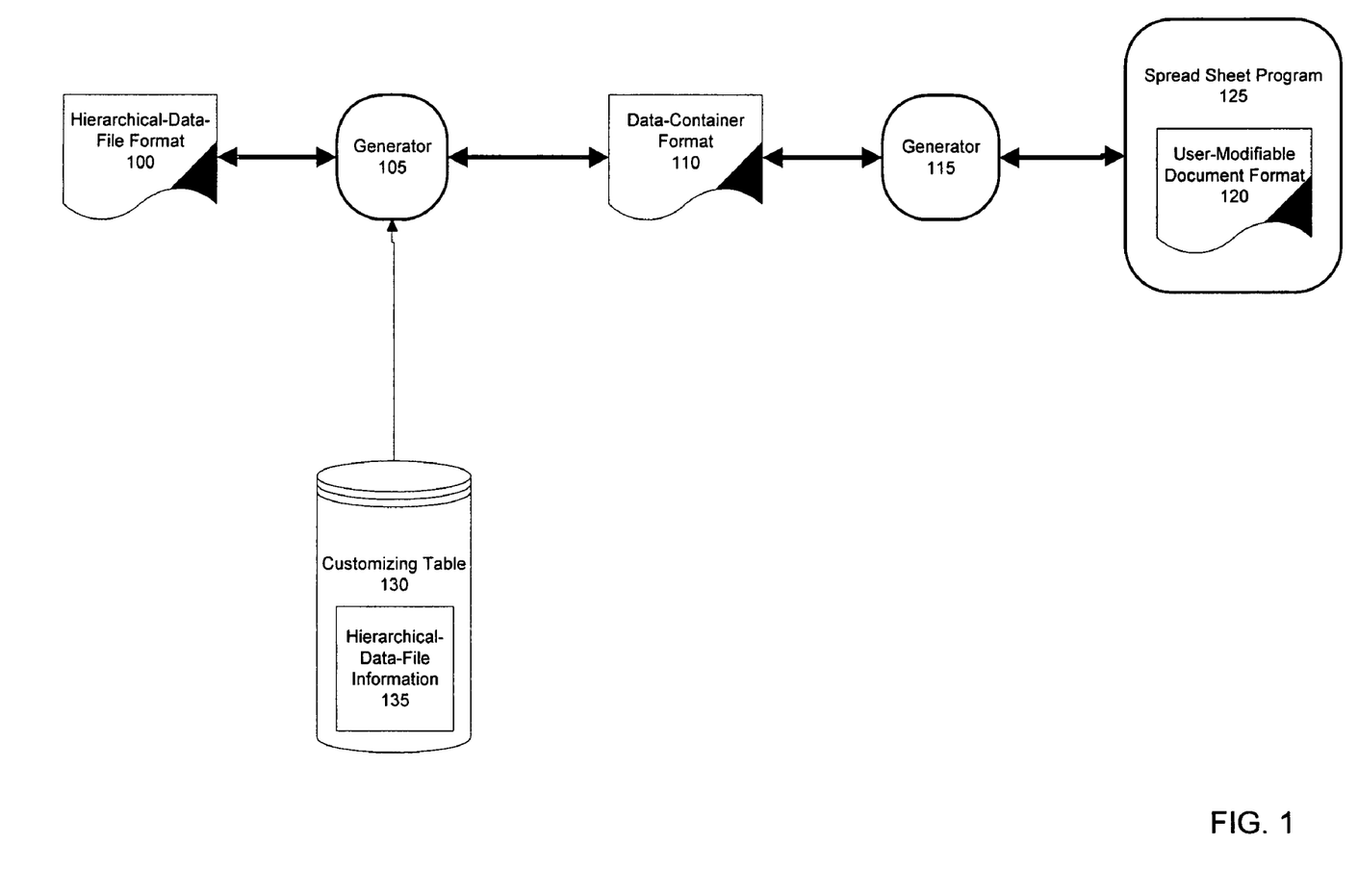
FIG. 1 is a block diagram that illustrates the components of an example system architecture, according to an embodiment of the present invention.

FIG. 1 is a block diagram that illustrates an example embodiment of the physical architecture of the present invention. Files, e.g. hierarchically structured documents of a database stored in a memory, may be provided in a computer environment for shared use by multiple users. The files may be presented as transaction documents. For example, a document may be a contract document in which, during a series of inter-party communications, at least two parties negotiate and change terms within the document.

In an embodiment of the present invention, a hierarchically structured document may be presented in hierarchical-data-file format 100. Hierarchical-data-file-format 100 is a type of document format in which a hierarchically structured document may be presented to a user for use, for example in business transactions. A user may choose to download a hierarchically structured document that is in hierarchical-data-file format 100, for example to modify the document. Core-data is one or many data elements of a file. When a file is downloaded, core-data may be extracted from the hierarchically structured document and rearranged in an output file that is in user-modifiable document format 120.

When in user-modifiable document format 120, the system and/or method may display the file in any application that allows a user to modify data, for example in spreadsheet program 125, such as Microsoft Excel. Example modifications are deleting, adding, and/or changing a data element. To aid the user in modification, the core-data is arranged in a manner that provides the user with a document context. Subsequent to modification, the user may upload the hierarchically structured document. When uploaded, the core-data may be rearranged in a document that is in hierarchical-data-file format 100.

Figure 2:
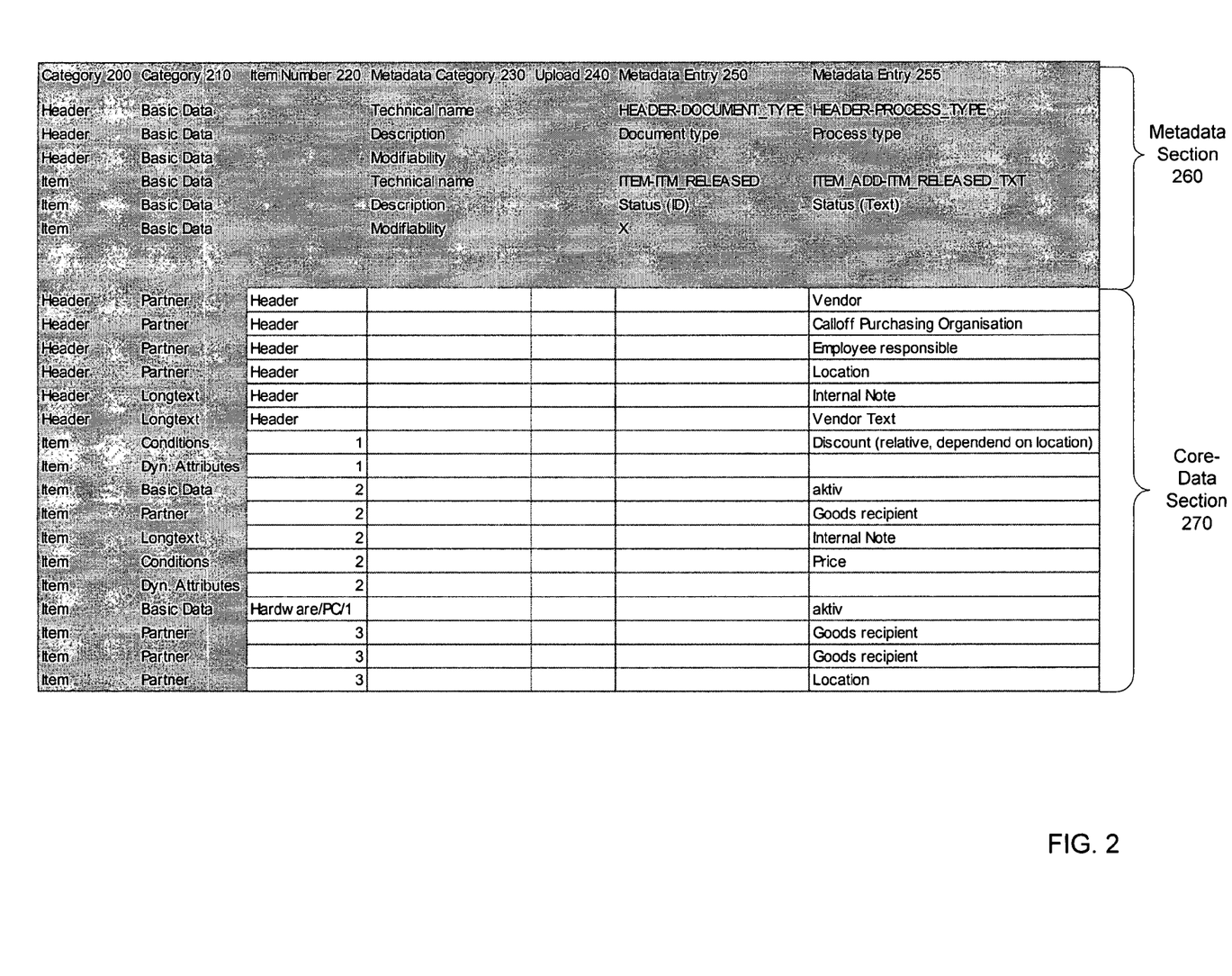
FIG. 2 is a file layout in a user-modifiable document format, including sample file entries, according to an embodiment of the present invention.

FIG. 2 is an example layout of a file in user-modifiable document format 120. To further aid the user in the modification of the core-data when the core-data is in user-modifiable document format 120, metadata that describes the core-data may be provided in the output file. When in user-modifiable document format 120, the core-data and the metadata may be separately presented in metadata section 260 and core-data section 270.

The system and/or method may provide an intermediate state in which the core-data is arranged in a data-container format 110 and in which the core-data and its corresponding metadata are grouped together in a single section. For example, the data may be arranged in a cell-oriented format, where each row contains all entries relating to a particular data type and each column contains a different aspect of the data type. For example, technical names, descriptive names, all indicators, and all core-data for a particular data type may be listed in a single row, each in a separate column. When a file is downloaded, the core-data may be extracted from hierarchical-data-file format 100, arranged with its corresponding metadata in data-container format 110, and then arranged with its corresponding metadata in user-modifiable document format 120. Like user-modifiable document format 120, when data is arranged in data-container format 110, the data arrangement provides a document context.

Similarly, when a file is uploaded, the core-data and its metadata may be collected from user-modifiable document format 120 and arranged in data-container format 110. Then the core-data may be rearranged in the hierarchical-data-file format 100.

Since many hierarchically structured documents may be provided, each with its unique core-data and each with its unique placement of the core-data, customizing table 130 may be provided to facilitate the extraction of the core-data from hierarchical-data-file format 100 for the arrangement in data-container format 110. Customizing table 130 may contain hierarchical-data-file information 135 that describes the particular file that is downloaded. Hierarchical-data-file information 135 may provide instructions that indicate how to extract data elements from and to arrange data elements in hierarchical-data-file format 100; how to arrange data elements in data-container format 110; and how to construct metadata corresponding to core-data extracted from hierarchical-data-file format 100. Generator 105 that extracts the core-data and arranges the core-data in data-container format 110 may be in contact with customizing table 130 and may use hierarchical-data-file information 135 to proceed with the core-data extraction and construction of corresponding metadata. Similarly, generator 105 may use hierarchical-data-file information 135 to reinsert the core-data into hierarchical-data-file-format 100. Consequently, only a generator 105 that is in contact with customizing table 130 may be used.

Data of all hierarchically structured documents, arranged in data-container format 110, may be similarly and generically converted to user-modifiable-document format 120. Similarly, data of all hierarchically structured documents, arranged in user-modifiable-document format 120, may be similarly and generically converted to data-container format 110. Hierarchical-data-file information 135, which describes each document's unique features, is therefore not required for these conversions. Consequently, any generator 115, which converts files between data-container format 110 and user-modifiable document format 120, may be used even though not in contact with customizing table 130.

When the data is presented in user-modifiable document format 120, the data may be presented in any of a number of forms. For example, a generator 115 may be used to present the data in tabular form, such as in the Tab Separated File (TSF) format. Alternatively, a different generator 115 may be used to present the data in the Extensible Markup Language (XML) format. Any file format known in the art that allows for presentation of core-data and metadata may be used.

In an embodiment of the present invention, when core-data is arranged in data-container format 110 and/or user-modifiable document format 120, the data elements of the core-data may be categorized and each data element may be identified within the file according to its category. For example, in category 200, data elements may be categorized as header data if the data elements relate to the document as a whole, and as item data if the data elements relate to particular items. In category 210, each header and item data element may be further categorized as basic data if it is general data; partner data if it indicates the identity of one of the parties involved in a particular transaction; longtext if it contains a user text entry; and conditions if it contains transaction parameters. Thus, for example, when a user enters "Hamburg," this entry may be placed in a row that contains a data element that belongs to the category of an item's partner, and may indicate a party's residence. An example transaction parameter is if a bid must be at least one hundred dollars. The system and/or method may also provide dynamic data elements. Dynamic data elements are user defined data elements that users may enter, for example when the file is in user-modifiable document format 120. Since many hierarchically structured documents may be provided, the system and/or method may provide a category in which entries indicate the particular hierarchically structured document to which the presented data elements belong. For example, entries within the category may indicate that the data elements belong to a hierarchically structured document that represents a contract.

In an embodiment of the present invention, a document may relate to multiple items arranged in an hierarchical structure. For example, a contract may relate to hardware. Hardware may be further subdivided by hardware item types, such as PC, and then further subdivided by item number. The system and/or method may track an item hierarchy and provide within a file that is in user-modifiable document format 120, an entry that identifies the item by its position within the hierarchy. For example, in item number 220, a particular PC may be identified as "Hardware/PC/1."

In an embodiment of the present invention, the metadata may describe each data element category (i.e. basic data, partner, longtext, and dynamic data element). When a user enters data, the data will be identified as belonging to a particular data element category. Consequently, the metadata will describe all of the user-entered data.

In an embodiment of the present invention, the metadata may be categorized in metadata category 230 to include a technical name, a descriptive name, and a modifiability indicator for each of the data elements that the metadata describes. In metadata entry 250 and 255, the metadata content for each metadata category may be entered. The technical name may be used by the generators when converting the data. The descriptive name may help a user to understand the document context of the core-data. The modifiability indicator may inform the user whether a data element may be modified and may indicate an error to a generator if a non-modifiable data element has been modified.

In an embodiment of the present invention, the metadata may further include an upload-indicator. For each data element a user changes, the user may mark the upload-indicator in the column of upload 240 to indicate that the user has modified the data element. In an alternative embodiment, the system and/or method may provide for automatic detection of modifications and may automatically mark the upload-indicator in response to the detection. According to these embodiments, when converting the file during an upload, generators 105 and 115 do not convert all data elements. Rather, the generators convert only those data elements that have been modified. When arranging the file in hierarchical-data-file format 100, generator 105 may reuse old stored data elements for all non-modified data elements.

Figure 3:
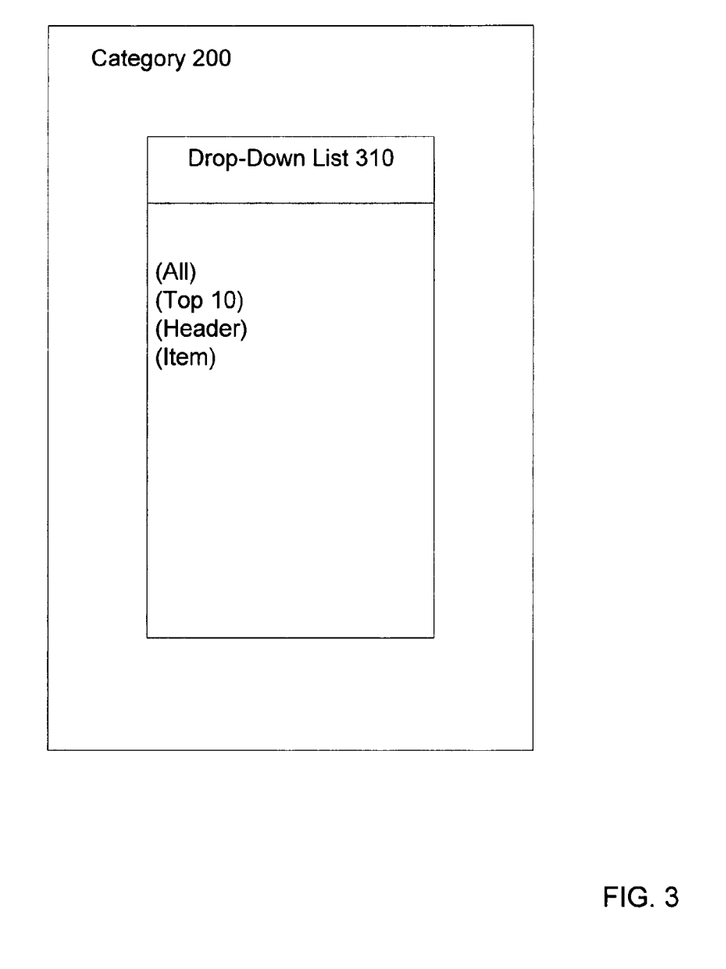
FIG. 3 is a diagram that illustrates a sorting drop-down list, including sample sorting options, according to an embodiment of the present invention.

FIG. 3 illustrates an example drop-down list for a generic sort. In an embodiment of the present invention, users may sort the data of the file when the file is in user-modifiable document format 120. The system and/or method may provide for sorting the data in a generic and/or customized manner. The sort option may be provided, for example, for each column of data in the file. For example, in one column, the entry in each row may indicate whether the data element is a header or an item. In a second column, each entry may indicate whether the data element is a condition, partner, longtext, or dynamic data element. In a generic sort, a user may be able to sort the file by choosing to display a particular data element type. For example, in drop-down list 310, the user may sort category 200 so that only items, and not headers, are displayed. To do so, the user would choose the Item option in drop-down list 310. Another example generic sort may be to view only the first 10 entries of a column. Other generic sorting options, as known in the art, may be provided Generic sorting choices may also be provided to a user in forms other than drop-down lists, e.g. in a tool-bar selection.

In a customized sort, users may, for example, choose to view only those rows that contain entries with particular values, texts, or ranges. An entry form may be provided in which a user may enter the parameters of the custom sort.

In an embodiment of the present invention, the system and/or method may provide a server to store many hierarchically structured documents, for example at a single central location. Users operating numerous remote terminals may access the server to view, download, and modify the documents. The server may perform the various conversions between hierarchical-data-file format 100 and user-modifiable document format 120. In this embodiment, when a user downloads a document for modification, the server performs the conversions and transmits the file in user-modifiable document format 120 to the user's terminal. Similarly, when a user uploads the file, the remote terminal may transmit the file to the server in user-modifiable document format 120, and the server may then convert the file to hierarchical-data-file format 100.

In an alternative embodiment, the server may convert the file between hierarchical-data file format 100 and data-container format 110, but does not convert the file between data-container format 110 and user-modifiable document format 120. In this embodiment, when a user downloads a document for modification, the server converts the file to data-container format 110 and transmits the file in data-container format 110 to the user's terminal. The terminal may then use its own local generator 115 to convert the file to user-modifiable document format 120. Similarly, when a user uploads the file, local terminal generator 115 may convert the file to data-container format 110 and then transmit the file to the server. The server may then convert the file to hierarchical-data-file format 100.

According to an embodiment of the present invention, for initiation of an upload or a download, the system and/or method may display on a user-terminal display, e.g. a computer screen, a download-button and an upload-button. The buttons may be displayed when the user runs an application on the user's terminal for manipulation of the hierarchically structured documents. According to one embodiment, the download-button may be displayed when the user views a document in hierarchical-data-file format 100. The upload-button may be displayed in spreadsheet program 125 when a user views a document in user-modifiable document format 120. In an alternative embodiment, a user may view the document in spreadsheet program 125 and, after the user modifies the data elements of the document, the user may locally save the document. Then, in an application other than spreadsheet program 125, the upload-button may be displayed. According to this alternative embodiment, when the user selects the upload-button, the user may be prompted to select a locally saved file for upload. The user may then select the locally saved document that the user had viewed and modified in spreadsheet program 125.

Figure 4:
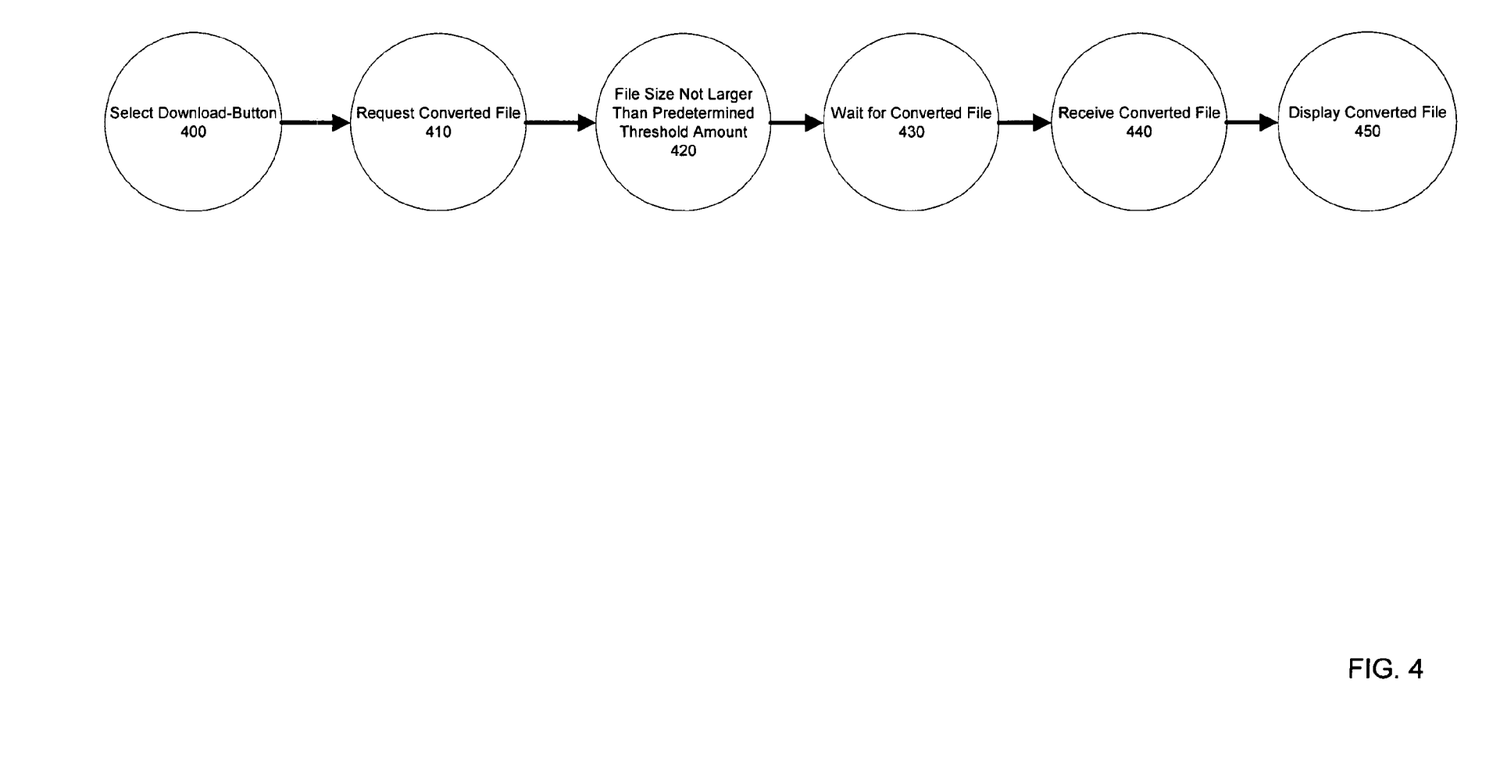
FIG. 4 is a flowchart that illustrates an example procedure performed during a direct conversion, according to an embodiment of the present invention.

FIG. 4 is a flowchart that illustrates an example procedure in which a user may obtain a file in user modifiable document format 120 via a direct conversion, according to an embodiment of the present invention. In 400, when a user selects the download-button, the application, in 410, may request, e.g. from the server, a converted version of a file. In 430, the application may wait for the converted file before allowing the user to proceed with any application procedures. After receiving the converted file in 440, the converted file may be immediately displayed within the application environment in 450. Similarly, when a user selects the upload-button, the application may wait for the file to be converted to hierarchical-data-file format 100 before allowing the user to proceed with any application procedures.

Figure 5:
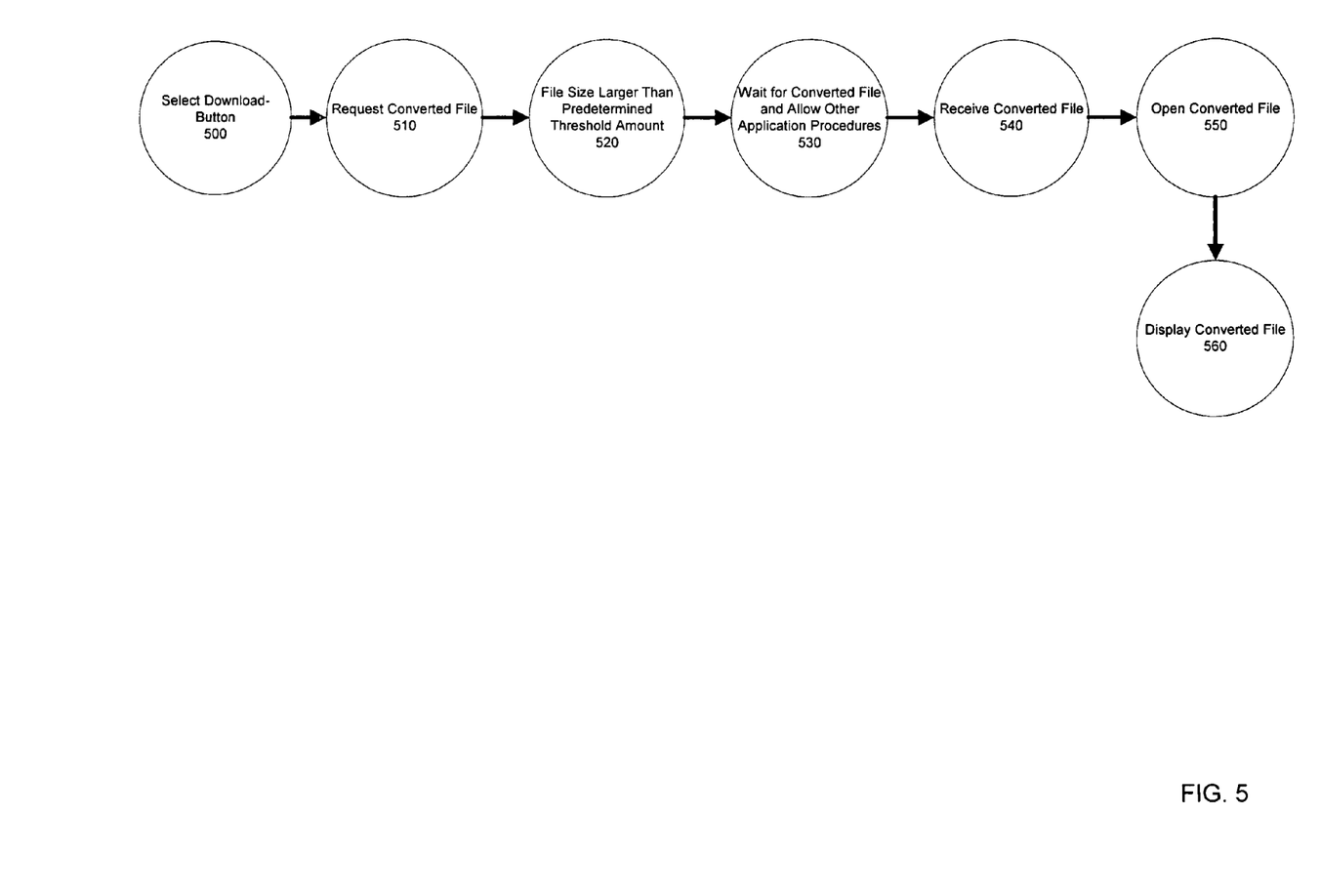
FIG. 5 is a flowchart that illustrates an example procedure performed during a background conversion, according to an embodiment of the present invention.

FIG. 5 is a flowchart that illustrates an example procedure in which a user may obtain a file in user-modifiable document format 120 via a background conversion, according to an embodiment of the present invention. In 500, when a user selects the download-button, the application, in 510, may request, e.g. from the server, a converted version of a file. In 530, the application may allow the user to continue with other application procedures, e.g. not dependent upon the file conversion, while waiting for the converted file. After the wait, in 540, the application environment may receive, e.g. via e-mail or any other form of communication, the converted file. The user may then open the sent file in 550. After the user opens the sent file in 550, the converted file may be displayed in the application environment in 560, e.g. on a computer screen. Similarly, when a user selects the upload-button, the application may allow the user to continue with other application procedures while waiting for the file to be converted.

If the requested file is a large file, the conversions may take a long time, in which case it is undesirable to require the user to wait for the converted file before continuing with other procedures. Therefore, in 420 and/or 520, the application or server may determine whether the file size exceeds a predetermined threshold amount, and on the basis of the determination, perform either a direct or a background conversion. The system and/or method may provide for the application to wait, in 430, for the converted file when the file size does not exceed the predetermined threshold amount; and, in 530, to allow the user to continue with other procedures, unrelated to the modification of the requested file when the file size is above the predetermined threshold amount. The system and/or method may notify the user, e.g. via a pop-up, that the file will be converted in a background conversion.

According to an embodiment of the present invention, even during a download background conversion, the application may wait for the file to be converted to data-container format 110. After this conversion, in 520, the server may determine that the file size exceeds the threshold amount. The application may then, in 530, allow the user to continue with other application procedures while the file is converted from data-container format 110 to user-modifiable document format 120.

Similarly, when a user selects the upload-button, the application may wait for generator 115 to convert the file from user-modifiable document format 120 to data-container format 110, and then allow the user to continue with other application procedures while waiting for generator 105 to convert the file to hierarchical-data-file format 100.

According to an embodiment of the present invention, during an upload background conversion, the system and/or method may apply the user's modifications to the file and check for errors, such as where a user has modified a data element the modifiability indicator of which indicates that the data element is non-modifiable. If no errors are found, the system and/or method may automatically save the modified file in hierarchical-data-file format 100 and send to the user, e.g. via e-mail or any other form of communication, a notification indicating successful upload. If errors are found, the system and/or method may send to the user, e.g. via e-mail or any other form of communication, an error report. When the user receives the error report, the system and/or method may allow the user to save the modified file with errors. Alternatively, the system and/or method may require the user to correct the errors before saving the file.

According to an embodiment of the present invention, during an upload direct conversion, the system and/or method may apply the user's modifications to the file and check for errors. If no errors are found, the system and/or method may automatically save the modified file and notify the user of successful upload. Alternatively, the system and/or method may notify the user that no errors have been found, and the user may then choose to save or discard the modified file. If errors are found, the system and/or method may notify the user of errors. When the user receives the error report, the system and/or method may allow the user to save the modified file with errors. Alternatively, the system and/or method may require the user to correct the errors before saving the file.

Files may be presented in display-mode or in change-mode. When more than one user extracts a file's core-data for modification, conflict can arise when each user attempts to upload the file, since each user may have dissimilarly modified the core-data. To avoid such conflict, the system and/or method may present the file to a user in change-mode when the file is not checked out by another user. In change-mode, a user may modify the file's core-data and immediately upload the core-data for arrangement in hierarchical-data-file format 100.

The system and/or method may present the document to a user in display-mode when the file is checked out by another user for modification. In display-mode, a user may modify the file's core-data, but the user may not upload the modified file. After the file has been checked in, the system and/or method may revert to a change-mode in which the user may upload the modified file. Whether in display-mode or in change-mode, a user may choose to locally save the modified file, without converting the file to hierarchical-data-file format 100, and upload the file at a later time. For example, a user may choose to locally save the modified file in user-modifiable document format 120, when in display-mode for future upload when the user enters change-mode.

Those skilled in the art can appreciate from the foregoing description that the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A computer system for modification of stored hierarchical data files, comprising:
   a memory configured to store a customizing table that includes a plurality of data sets, each data set unique to a particular one of a plurality of hierarchical data file types; and
   a processor configured to convert data between a first format and one of a plurality of user-modifiable document formats, wherein:
      when the data is in the first format, the data is arranged as an hierarchical document;
      when the data is in the user-modifiable document format, the data is arranged as a plurality of data elements, the arrangement configured to provide a document context;
      the conversion includes a first conversion and a second conversion;
      in the first conversion, the processor is configured to convert, according to one of the data sets, the data between the first format and a second format;
      in the second conversion, the processor is configured to convert the data between the second format and the user-modifiable document format, the data set not required for the second conversion;
      when the data is in the second format, the data is arranged as the plurality of data elements, the arrangement configured to provide the document context;
      when a download-button is selected, the processor is configured to convert the data from the first format to the second format, and then from the second format to the user-modifiable document format;
      when an upload-button is selected, the processor is configured to convert the data from the user-modifiable document format to the second format, and then from the second format to the first format; and
      the processor is configured to:
         open a hierarchical data file for a first user in a change-mode, and
         open the hierarchical data file for a second user in a display-mode and bar the second user from opening the hierarchical data file in the change-mode when the first user enters the change-mode for the hierarchical data file, the upload-button selectable when in the change-mode and not selectable when in the display-mode, the download-button selectable when in one of the display-mode and the change-mode.

2. The computer system of claim 1, wherein:
   when in the display-mode, the data of the hierarchical data file is modifiable by the second user, and the modified data is locally savable; and
   the second user automatically enters the change-mode when the first user exits the change-mode.

3. A computer-implemented method for modification of stored hierarchical data files, comprising:
   storing a plurality of data sets, each data set unique to a particular one of a plurality of hierarchical data file types;
   converting data between a first format and one of a plurality of user-modifiable document formats;
   a first user entering into a change-mode for a hierarchical data file; and
   a second user entering into a display-mode and not the change-mode for the hierarchical data file when the first user enters the change-mode for the hierarchical data file,
   wherein:
      an upload-button is selectable when in the change-mode and not selectable when in the display-mode;
      a download-button is selectable when in one of the display-mode and the change-mode;
      when the data is in the first format, the data is arranged as an hierarchical document;
      the conversion includes a first conversion and a second conversion;

the first conversion includes converting, according to one of the data sets, the data between the first format and a second format;

the second conversion includes converting the data between the second format and the user-modifiable document format, the data set not required for the second conversion;

when the download-button is selected, the data is converted:
- from the first format to the second format in the first conversion; and
- from the second format to the user-modifiable document format in the second conversion;

when the upload-button is selected, the data is converted:
- from the user-modifiable document format to the second format in the second conversion; and
- from the second format to the first format in the first conversion; and the conversion of the data from the first format to the second format includes arranging the data as a plurality of data elements, the arrangement providing a document context.

4. The computer-implemented method of claim 3, wherein when in the display-mode, the data of the hierarchical data file is modifiable by the second user, and the modified data is locally savable, the second user automatically entering the change-mode when the first user exits the change-mode.

* * * * *